(12) United States Patent
De Larrard et al.

(10) Patent No.: US 7,678,322 B2
(45) Date of Patent: Mar. 16, 2010

(54) METHOD OF PRODUCING MANUFACTURED AGGREGATES

(75) Inventors: François De Larrard, Nantes (FR); Vincent Ledee, Brains (FR); Thierry Sedran, La Chapelle sur Erdre (FR)

(73) Assignee: Laboratoire Central des Ponts Et Chaussees, Paris (FR)

( * ) Notice: Subject to any disclaimer, the term of this patent is extended or adjusted under 35 U.S.C. 154(b) by 1069 days.

(21) Appl. No.: 10/567,465

(22) PCT Filed: Aug. 6, 2004

(86) PCT No.: PCT/FR2004/002102

§ 371 (c)(1),
(2), (4) Date: Feb. 7, 2006

(87) PCT Pub. No.: WO2005/016848

PCT Pub. Date: Feb. 24, 2005

(65) Prior Publication Data

US 2006/0267240 A1  Nov. 30, 2006

(30) Foreign Application Priority Data

Aug. 8, 2003 (FR) .................................. 03 09770

(51) Int. Cl.
*B28B 21/92* (2006.01)
(52) U.S. Cl. .................. 264/333; 106/36; 106/638; 106/816; 106/817
(58) Field of Classification Search .............. 264/333; 106/36, 713, 724, 638, 816, 817
See application file for complete search history.

(56) References Cited

U.S. PATENT DOCUMENTS

2003/0109592 A1* 6/2003 Shulman ...................... 521/54

(Continued)

FOREIGN PATENT DOCUMENTS

FR 2296054 7/1976

(Continued)

OTHER PUBLICATIONS

Modified water-cement ratio law for silica fume concretes (S. Bhanja & B. Sengupta; Cement and Concrete Research; 33 (2003) 447-450).*

(Continued)

*Primary Examiner*—Joseph S Del Sole
*Assistant Examiner*—John P Robitaille
(74) *Attorney, Agent, or Firm*—Manelli Denison & Selter pllc; Edward J. Stemberger

(57) ABSTRACT

The invention relates to a method of fabricating manufactured aggregates (10), characterized in that the following steps are performed:

supplying a first material (12) comprising particles;
supplying elements (16, 18, 20, 22) for forming a second material (14);
mixing a predetermined quantity (Q12) of said first material (12) with a predetermined quantity (Q16, Q18, Q20, Q22) of each of said elements (16, 18, 20, 22) of said second material (14), so as to obtain a mortar (M12-14) made up of inclusions (12) corresponding to the first material and a matrix (14) corresponding to the second material (14);
subjecting a first cure (T1) to the mortar (M12-14) for a predetermined first cure duration (t1); and
crushing (C) said mortar (M12-14) to obtain manufactured aggregates (10).

13 Claims, 1 Drawing Sheet

U.S. PATENT DOCUMENTS

2004/0069189 A1 * 4/2004 Aoki et al. ............... 106/713

FOREIGN PATENT DOCUMENTS

| GB | 2327667 | 12/1999 |
| --- | --- | --- |
| JP | 08209606 | 8/1996 |
| JP | 09 255402 | 9/1997 |

OTHER PUBLICATIONS

"Influence of Superplasticizer, Plasticizer, and Silica Fume on the Drying Shrinkage of High-Strength Concrete Subjected to Hot-Dry Field Conditions" (S.H. Alsayed; Cement and Concrete Research; vol. 28, No. 10, pp. 1405-1415, 1998).*

Katahira, F., Chemical Abstract + Indexes, American Chemical Society, Columbus, Oh., vol. 118, No. 14, p. 395, Apr. 4, 1993.

Bayomy Fouad M., "Development and analysis of cement-coated aggregates for asphalt mixtures", ASTM Special Technical Pub., ASTM US, No. 1147, Dec. 10, 1992.

* cited by examiner

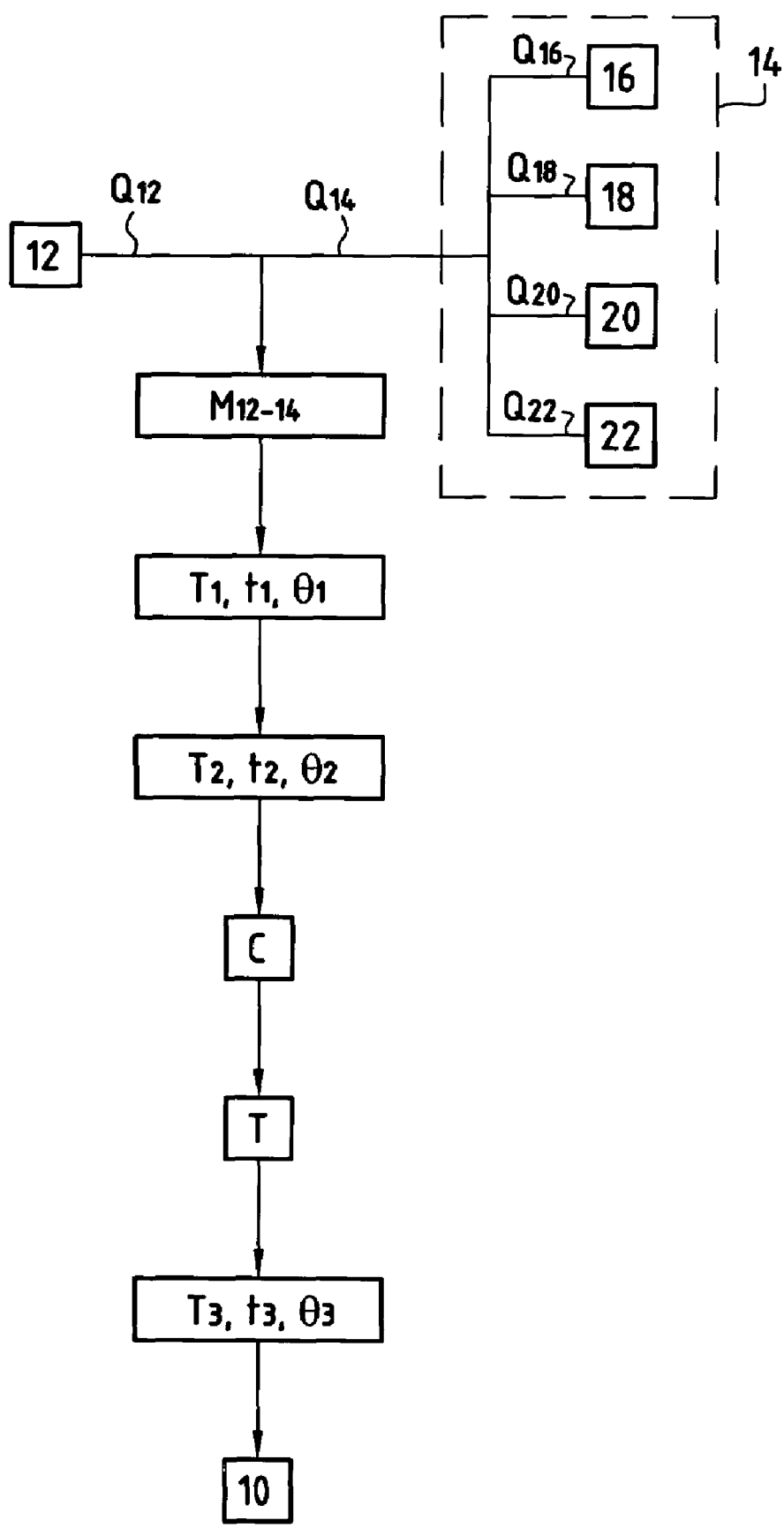

METHOD OF PRODUCING MANUFACTURED AGGREGATES

This application is the national phase of international application PCT/FR2004/00202 filed on Aug. 6, 2004 which designated the U.S.

The invention relates to a method of manufacturing manufactured aggregates.

The grip of tires on a roadway is an important characteristic to be considered for road safety, in addition to the actual behavior of vehicle drivers, and in particular the behavior of car drivers. This grip depends on the tire, on the surface course of the roadway, and in particular on the microroughness of the aggregates included in the surface course.

Aggregate microroughness is an essential parameter for grip, since the surface roughness of the roadway depends thereon. On a wet roadway, it is this roughness that serves to break the film of water and thus provide dry contact between the roadway and the tire.

Microroughness is an intrinsic characteristic of the aggregate. Consequently, in order to ensure that tire-to-roadway grip is maintained sufficiently over time, criteria relating to resistance to polishing have been included in the standards and specifications relating to aggregates for use in the surface courses of roadways. These criteria are expressed as an accelerated polishing coefficient (APC) or as resistance to accelerated polishing (RAP) depending on the test used. These tests are defined respectively in the following standards: NF P 18-575 and XP P 18-580.

Under the effect of road traffic, aggregates are subjected to surface polishing, leading to a progressive decrease in roughness.

Consequently, in order to ensure that the microtexture of aggregates is maintained durably, the surface courses of certain portions of roadway where grip must be at a maximum contain manufactured aggregates presenting microroughness that is greater than that which can be found in natural rocks.

Amongst known aggregates, the highest APC values to be found are close to 0.65 for natural rocks and 0.75 for artificial materials, such as for example materials including calcined bauxite.

Nevertheless, fabricating manufactured grains out of bauxite consumes a large amount of energy.

As a result, known manufactured aggregates are relatively expensive and are generally made available in small quantities only, thus considerably limiting the use thereof.

An object of the invention is to provide a method of fabricating manufactured aggregates that makes it possible to fabricate manufactured aggregates at lower cost and in larger quantities.

This object of the invention is achieved by the fact that the following steps are performed:

supplying a first material comprising particles;
supplying elements for forming a second material;
mixing a predetermined quantity of said first material with a predetermined quantity of each of said elements of said second material, so as to obtain a mortar made up of inclusions corresponding to the first material and a matrix corresponding to the second material;
subjecting the mortar to a first cure for a predetermined first cure duration; and
crushing said mortar to obtain manufactured aggregates.

"Curing" means that the mortar is subjected to treatment enabling exchanges of water and/or heat with the outside medium to be controlled. Specifically, the cures serve to prevent the matrix from dehydrating while on the contrary encouraging hydration that tends to consolidate the matrix. Consequently, the (duration and temperature) conditions in which cures of this type are formed determine the consolidation of the matrix and thus of the mortar.

Advantageously, the first material presents hardness greater than that of the second material and forms hard inclusions in the mortar.

To be sure that the roughness constituted by the particles of the first material is durable, it is preferable for said material to present good mechanical qualities; consequently, the first material preferably comes from a mother rock that presents good mechanical properties, in particular good wear resistance and fragmentation resistance.

Consequently, an original rock having Los Angeles coefficient values less than 12 and Micro-Deval coefficient values less than 20 is preferably used for the first material.

In order to produce a high level of roughness within the mortar, it is essential for the mortar to be hydrated, but for the cure that enables such hydration to take place not to be too long. Crushing after a short cure serves to lay bare a certain number of inclusions and thus to obtain a high degree of roughness.

Consequently, prior to crushing, the mortar is advantageously hydrated by a second cure during a second predetermined cure duration so that adhesion within the mortar between the inclusions and the matrix is not too strong. The duration of this second cure is limited so that the matrix is consolidated just enough to ensure firstly that the inclusions adhere sufficiently to the matrix to avoid them becoming separated during crushing, and secondly to ensure that the breaks obtained during crushing serve to reveal an appearance that is rough.

If the second cure is too long, that will lead to intergranular breaks appearing within the inclusions themselves, leading to an appearance that is much smoother and thus to roughness that is smaller.

After crushing, the crushed mortar is advantageously subjected to a third cure by being immersed in water for a third predetermined cure duration, which then serves to finish off the hardening of the matrix within the crushed mortar. This maturing leads to adhesion developing between the inclusions and the matrix that makes it possible to guarantee strong mutual connection between these two materials and thus to limit any risk of the inclusions becoming separated.

Depending on the nature of the inclusions of the first material and in order to generate the maximum possible amount of roughness in the manufactured aggregates, the first material advantageously comprises particles of a size smaller than 1.5 mm. When using manufactured aggregates in a surface course of a roadway, it is even preferable for the inclusions to be of a size smaller than 1 mm.

In order to increase the amount of roughness, the fines, i.e. the particles of substantially micrometer size, are advantageously eliminated by successive washings of the first material prior to mixing it with the second material.

Advantageously, in order to obtain good development of the mechanical performance of the second material, leading in particular to good adhesion of the inclusions in the matrix, the elements of the first material include a cement and silica fume.

Also preferably, the mortar is such that, if it is not previously crushed, its compression strength lies in the range 80 megapascals (MPa) to 110 MPa after the third cure.

The adhesion of the inclusions in the matrix depends among other things on the amount of water that is present. For a cement-based matrix, sand inclusions combine therewith to form lime silicates within the mortar. For a given initial composition, adhesion is made stronger by lengthening the duration of the second cure of the mortar.

The invention can be well understood and its advantages appear more clearly on reading the following detailed description of implementations of the invention described as non-limiting examples.

The description refers to the sole accompanying FIGURE which is a diagram showing the method of the invention.

The sole FIGURE is a diagram showing the steps of a preferred implementation of the method enabling manufactured aggregates 10 to be obtained from a mortar M12-14 obtained by mixing a first material 12 that comprises particles referred to below as inclusions, and a second material 14 made up of a plurality of elements forming a matrix 14 for the mortar M12-14. The elements considered in the makeup of the second material 14 for forming the matrix 14 of the mortar M12-14 are preferably selected from cements, silica fume, superplasticizers, and water.

Specifically, the matrix 14 of the second material comprises a cement enabling an mortar M12-14 to be obtained having compression strength lying in the range 90 MPa to 110 MPa, and preferably being about 100 MPa. Thus, a "CEM I 52.5" cement 16 and silica fume 18 have been selected.

The second material 14 further includes a superplasticizer 20 enabling the water/cement ratio to be limited.

Thus, the matrix 14 is advantageously made up of a mixture of a quantity Q16 of a cement 16, preferably a cement of the said "CEM I 52.5" type, a quantity Q18 of silica fume 18, a quantity Q20 of superplasticizer 20, and a quantity Q22 of water 22.

Advantageously, the quantity Q16 lies in the range 600 kilograms per cubic meter ($kg/m^3$) to 700 $kg/m^3$, whereas the quantity Q18 lies in the range 60 $kg/m^3$ and 70 $kg/m^3$, and the quantity Q20 lies in the range 10 $kg/m^3$ to 15 $kg/m^3$.

The quantity of water Q22 is advantageously determined so that the water/cement ratio lies in the range 30% to 35%, and is preferably about 33%. Consequently, with the said quantities Q16 of cement, the quantity of water Q22 preferably lies in the range 200 $kg/m^3$ to 230 $kg/m^3$.

After mixing a quantity Q12 preferably lying in the range 1400 $kg/m^3$ to 1600 $kg/m^3$ of inclusions 12 with the said quantities of the elements of the first material, a mortar M12-14 is obtained which presents a quantity Q12 of inclusions in a matrix 14 in a quantity Q14 that preferably lies in the range 870 $kg/m^3$ to 1015 $kg/m^3$, the quantity Q14 corresponding to the sum of the said quantities of elements that have been added. The mortar M12-14 is subjected to a first cure T1, specifically by being conserved at ambient temperature $\theta 1$ and at least 95% relative humidity, for a first cure duration t1 lying in the range 12 hours (h) to 36 h, and preferably about 24 h.

The inclusions 12 and the elements of the second material 14 are preferably mixed together simultaneously prior to forming the matrix 14, i.e. the inclusions 12 are mixed directly with the cement 16, the silica fume 18, the superplasticizer 20, and the water 22.

The inclusions 12 are preferably a sand, e.g. a gneiss sand or a diortic sand.

The fluidity of the mortar M12-14 is optimized to make compacting easy in 4×4×16 cubic centimeter ($cm^3$) molds using an impact table in compliance with standard EN 196-1; the mortar as compacted in this way forms test pieces of the mortar M12-14.

After carrying out this first cure T1, the 4×4×16 $cm^3$ test pieces are unmolded and a second cure T2 is applied thereto, corresponding to being immersed in water at a temperature $\theta 2$ lying in the range 18° C. to 25° C., preferably about 20° C., for a second cure duration t2 lying in the range 12 h to 36 h, preferably substantially equal to 24 h. This second cure T2 is performed to generate weak bonds within the mortar M12-14 that is to be crushed.

After performing the second cure T2 on the mortar M12-14 test pieces, they are split in two and then crushed using a jaw crusher C. Crushing is performed several times over and then the crushed mortar is screened in a screen T enabling manufactured grains 10 to be selected of sizes lying in the range 2 millimeters (mm) to 15 mm, and preferably in the range 6.3 mm to 10 mm.

A third cure T3 by immersing in water at a temperature $\theta 2$ lying in the range 35° C. to 45° C. and preferably equal to about 40° C. is then performed for a third cure duration t3 lying in the range 10 days to 15 days, in order to finish off hydration of the cement 16 which began during the second cure T2 and in order to consolidate the resulting manufactured grains 10, consolidating the bonds between the inclusions 12 and the matrix 14. This third cure T3 makes it possible to obtain strong bonds that limit the risk of the inclusions 12 separating. After this third cure T3, the mortar M12-14 is mature and consolidated manufactured grains 10 are obtained.

Two compositions given in the table below are given as examples of manufactured aggregates.

|  |  | Example 1 (in $kg/m^3$) | Example 2 (in $kg/m^3$) |
|---|---|---|---|
| Material 12 | Gneiss sand | 1412 | — |
| Material 12 | Diortic sand | — | 1550 |
| Material 14 | CEM I 52.5 cement | 652 | 673 |
|  | Silica fume | 65 | 68 |
|  | Superplasticizer | 12.3 | 13.0 |
|  | Water | 217 | 223 |
|  | Water/cement ratio | 33% | 33% |

With reference to Example 1, a quantity Q12 of gneiss sand substantially equal to 1412 $kg/m^3$ is mixed with the elements of the second material in quantities corresponding to a quantity Q14 substantially equal to 946.3 $kg/m^3$. This quantity Q14 corresponds substantially to mixing a quantity Q16 of "CEM I 52.5", cement equal to about 652 $kg/m^3$, with a quantity Q18 of silica fume equal to about 65 $kg/m^3$, a quantity Q20 of superplasticizer of about 12.3 $kg/m^3$, and a quantity Q22 of water of about 217 $kg/m^3$.

Prior to mixing, the gneiss sand is preferably screened through a 1.5 mm screen so as to retain as inclusions 12 only those grains of sand that are of a size that is preferably less than or equal to 1.5 mm.

The mortar M12-14 obtained by mixing the said quantities, by molding, performing the first cure T1, unmolding, performing the second cure T2, crushing C, and then screening to select the manufactured grains of size preferably lying in the range 6.3 mm to 10 mm, as described above, is then subjected to the third cure T3 for a long duration T3 of immersion, substantially equal to 12 days.

Compression strength tests performed on 4×4×16 $cm^3$ test pieces after being subjected to the same cycle of three cures, but without crushing, show that the mortar M12-14 presents compression strength of about 91 MPa.

With reference to Example 2, a quantity Q12 of diortic sand substantially equal to 1550 $kg/m^3$ is mixed with a quantity Q14 substantially equal to 977 $kg/m^3$. This quantity Q14 corresponds substantially to mixing a quantity Q16 of "CEM I 52.5" cement of about 673 $kg/m^3$ with a quantity Q18 of silica fume of about 68 kg/m³, a quantity Q20 of superplasticizer of about 13.0 kg/m³, and a quantity Q20 of water of about 223 kg/m³.

As in Example 1, prior to mixing, the diortic sand is preferably subjected to screening, but preferably using a 1 mm screen so as to retain as particles only those grains of sand having a size that is preferably smaller than or equal to 1 mm.

The same steps as those performed for the mortar of Example 1 are then performed, except that the duration of the third cure t3 is different, since it is equal substantially to 13 days.

Compression strength tests performed on 4×4×16 cm³ test pieces that have been subjected to the same cycle of three cures without crushing show that the resulting strength is about 98 MPa for the mortar M12-14 of Example 2.

The manufactured aggregates 10 obtained using the above-described method and the quantities of Example 1 or Example 2 present an APC value of about 0.70. Such manufactured aggregates thus present advantageous properties enabling them to be used in surface courses requiring large APC values. In addition, they are easy to manufacture and inexpensive. For example, it suffices to couple a prefabrication factory with a conventional quarry crushing installation in order to produce manufactured aggregates as described on an industrial scale. The costs associated with fabricating manufactured aggregates using the method of the invention are estimated as being half the costs of fabricating presently known manufactured aggregates.

The invention claimed is:

1. A method of fabricating manufactured aggregates wherein the following steps are performed:
   supplying a first material comprising particles of sand;
   supplying cement, water, and elements forming a second material; mixing a certain quantity of said first material with a certain
   quantity of cement, water, and each of said elements of said second material, so as to obtain a mortar made up of inclusions corresponding to the first material and a matrix corresponding to the second material;
   subjecting the mortar to a first cure for a certain first cure duration; and
   crushing said mortar so that breaks are not within the inclusions to obtain manufactured aggregates of size lying in the range 2 mm to 15 mm so as to obtain a degree of roughness; and
   hydrating the crushed mortar by another cure during a certain cure duration.

2. A method according to claim 1, wherein the mortar obtained by mixing is unmolded after being subjected to the first cure.

3. A method according to claim 1 wherein the ratio of the quantity of water to the quantity of cement lies in the range 30% to 35%.

4. A method according to claim 1, wherein the first material presents hardness greater than that of the second material and forms hard inclusions in the mortar.

5. A method according to claim 1, wherein, prior to being crushed, the mortar is also subjected to a second cure for a second certain cure duration.

6. A method according to claim 5, wherein the certain durations of the first cure and of the second cure are respectively substantially equal to 24 hours.

7. A method according to claim 1, wherein screening is performed to select manufactured grains of size lying in the range 2 mm to 15 mm.

8. A method according to claim 1, a wherein the certain duration of said another cure lies in the range 10 days to 15 days.

9. A method according to claim 1, wherein the first material comprises particles of a size smaller than 1.5 mm.

10. A method according to claim 1, wherein the first material comprises particles of a size smaller than 1 mm.

11. A method according to claim 1, wherein the elements of the second material include a cement.

12. A method according to claim 1, wherein the elements of the second material include silica fume.

13. A method according to claim 1, wherein the elements comprise silica fume and a superplasticizer.

* * * * *